United States Patent
Jeon et al.

(10) Patent No.: US 10,823,909 B2
(45) Date of Patent: Nov. 3, 2020

(54) DISPLAY APPARATUS

(71) Applicant: SAMSUNG ELECTRONICS CO., LTD., Suwon-si (KR)

(72) Inventors: Taehee Jeon, Suwon-si (KR); Daeyoung Kim, Suwon-si (KR); Hyungki Kim, Suwon-si (KR); Yongsung Yoo, Suwon-si (KR); Kilhong Lee, Suwon-si (KR); Dukjin Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/599,344

(22) Filed: Oct. 11, 2019

(65) Prior Publication Data
US 2020/0132923 A1 Apr. 30, 2020

(30) Foreign Application Priority Data
Oct. 30, 2018 (KR) .......................... 10-2018-0130434

(51) Int. Cl.
*F21V 8/00* (2006.01)
*G02F 1/1333* (2006.01)

(52) U.S. Cl.
CPC ......... *G02B 6/0088* (2013.01); *G02B 6/0091* (2013.01); *G02F 1/133308* (2013.01); *G02F 2001/133314* (2013.01); *G02F 2001/133317* (2013.01)

(58) Field of Classification Search
CPC ................ G02B 6/0088; G02B 6/0091; G02F 2001/133314; G02F 2001/133317
See application file for complete search history.

(56) References Cited

U.S. PATENT DOCUMENTS

| | | | |
|---|---|---|---|
| 7,911,553 B2 | 3/2011 | Tanaka | |
| 8,477,264 B2 | 7/2013 | Morito | |
| 8,659,718 B2 | 2/2014 | Sekiguchi et al. | |
| 8,879,027 B2* | 11/2014 | Ishii | G02F 1/133382 345/90 |
| 9,448,350 B2* | 9/2016 | An | F21V 7/0025 |
| 9,588,273 B2 | 3/2017 | Song et al. | |
| 9,618,784 B2* | 4/2017 | Li | G02B 6/0085 |

(Continued)

FOREIGN PATENT DOCUMENTS

| CN | 202394013 U | 8/2012 |
|---|---|---|
| CN | 106195754 A | 12/2016 |

(Continued)

OTHER PUBLICATIONS

Communication (PCT/ISA/210) dated Dec. 18, 2019 by the International Searching Authority in counterpart International Patent Application No. PCT/KR2019/011132.

(Continued)

*Primary Examiner* — William N Harris
(74) *Attorney, Agent, or Firm* — Sughrue Mion, PLLC

(57) ABSTRACT

A display apparatus includes a display panel, a light guide plate for guiding light to the display panel, a light source for irradiating the light guide plate with light, and a middle mold disposed between the display panel and the light guide plate and supporting an edge region of the light guide plate. The middle mold includes a groove formed on a surface adjacent to the light guide plate.

19 Claims, 9 Drawing Sheets

(56) References Cited

U.S. PATENT DOCUMENTS

| | | | |
|---|---|---|---|
| 10,120,224 B2* | 11/2018 | Lee | H05K 999/99 |
| 10,222,532 B2* | 3/2019 | Pumyea | G02B 6/003 |
| 10,379,287 B2* | 8/2019 | Li | G02F 1/133385 |
| 2007/0008451 A1* | 1/2007 | Tanaka | G02B 6/009 |
| | | | 349/58 |
| 2007/0165421 A1 | 7/2007 | Sakai et al. | |
| 2012/0162569 A1* | 6/2012 | Sekiguchi | G02F 1/133308 |
| | | | 349/58 |
| 2012/0200798 A1* | 8/2012 | Morito | G02F 1/133615 |
| | | | 349/58 |
| 2013/0114003 A1* | 5/2013 | Tanaka | G02F 1/133308 |
| | | | 348/836 |
| 2013/0242225 A1* | 9/2013 | Yu | G02F 1/133615 |
| | | | 349/58 |
| 2013/0258230 A1* | 10/2013 | Yu | G02F 1/133308 |
| | | | 349/58 |
| 2013/0258243 A1 | 10/2013 | Zhou et al. | |
| 2013/0336003 A1* | 12/2013 | Yang | G02B 6/0023 |
| | | | 362/608 |
| 2014/0063401 A1 | 3/2014 | Kuo et al. | |
| 2014/0085569 A1* | 3/2014 | Choi | G02F 1/133606 |
| | | | 349/64 |
| 2014/0176851 A1* | 6/2014 | Lee | G02F 1/133308 |
| | | | 349/58 |
| 2015/0055026 A1* | 2/2015 | Ikuta | H04N 5/64 |
| | | | 348/791 |
| 2015/0177548 A1* | 6/2015 | Jeon | G02F 1/133308 |
| | | | 349/12 |
| 2015/0198756 A1* | 7/2015 | Song | G02B 6/0025 |
| | | | 349/65 |
| 2015/0205036 A1* | 7/2015 | Shimizu | H04N 5/66 |
| | | | 348/790 |
| 2015/0219821 A1* | 8/2015 | Seo | G02B 6/0088 |
| | | | 362/608 |
| 2015/0226996 A1* | 8/2015 | Ohashi | G02B 6/0011 |
| | | | 348/725 |
| 2015/0268411 A1 | 9/2015 | Hu et al. | |
| 2015/0346425 A1* | 12/2015 | Ozeki | G02B 6/0085 |
| | | | 362/612 |
| 2015/0346541 A1 | 12/2015 | Ando et al. | |
| 2016/0187713 A1 | 6/2016 | Jung et al. | |
| 2016/0223739 A1* | 8/2016 | Yoon | G02B 6/0088 |
| 2016/0291231 A1 | 10/2016 | Jang et al. | |
| 2016/0341877 A1* | 11/2016 | Kim | G02B 6/0026 |

FOREIGN PATENT DOCUMENTS

| | | |
|---|---|---|
| JP | 4679985 B2 | 5/2011 |
| JP | 5032677 B2 | 9/2012 |
| JP | 5512506 B2 | 6/2014 |
| KR | 10-1318437 B1 | 10/2013 |
| KR | 10-2015-0084216 A | 7/2015 |
| KR | 10-2016-0116792 A | 10/2016 |

OTHER PUBLICATIONS

Communication (PCT/ISA/237) dated Dec. 18, 2019 by the International Searching Authority in counterpart International Patent Application No. PCT/KR2019/011132.

Communication (EP OA) dated Jan. 8, 2020 by the European Patent Office in counterpart European Patent Application No. 19194834.8.

* cited by examiner

DISPLAY APPARATUS

CROSS-REFERENCE TO RELATED APPLICATION(S)

This application is based on and claims priority under 35 U.S.C. § 119 to Korean Patent Application No. 10-2018-0130434, filed on Oct. 30, 2018, in the Korean Intellectual Property Office, the disclosure of which is incorporated by reference herein in its entirety.

BACKGROUND

Field

The disclosure relates to an improved display apparatus, particularly, to displaying a uniform screen.

Description of Related Art

A display apparatus displays a screen and may include a monitor, a television, or the like.

The display apparatus may include a display apparatus using a cathode ray tube, a display apparatus using a light emitting diode (LED), a display using organic light emitting diode (OLED), a display apparatus using active-matrix OLED, a liquid crystal display, an e-paper display apparatus, or the like.

The display apparatus includes a display panel for optically displaying an image and a backlight unit (BLU) for providing light to a display panel to display an image.

The backlight unit includes a plurality of LEDs to provide light to the display panel. When a light source is disposed on one side of the display panel, a loss of light occurs, and some of the regions of the display panel might not be uniformly irradiated with light. Therefore, there is a problem that a brightness difference occurs in the entire screen of the display apparatus.

SUMMARY

Embodiments may overcome the above disadvantages and other disadvantages not described above. Also, an embodiment is not required to overcome the disadvantages described above, and an embodiment may not overcome any of the problems described above.

Embodiments of the disclosure provide a display apparatus capable of minimizing light leakage phenomenon which may occur in a light guide plate by a middle mold having an improved structure.

In accordance with an aspect of the disclosure, a display apparatus includes a display panel, a light guide plate for guiding light to the display panel, a light source for irradiating the light guide plate with light, and a middle mold disposed between the display panel and the light guide plate and supporting an edge region of the light guide plate, and the middle mold may include a groove formed on a surface adjacent to the light guide plate.

The groove may have one side surface in the groove being collinearly disposed with one side surface of the light guide plate.

The groove may be formed along an edge region of the light guide plate.

The cross section of the groove may be formed in shapes of a quadrangle, a trapezoid, a semicircle, a polygon, or T.

The groove may include an inclined surface that is inclined on one side in a direction toward the light source.

The light source may be disposed to face at least one of up, down, left, and right four side surfaces of the light guide plate.

The light source may include a substrate that is disposed to be faced on one side surface of the light guide plate and LEDs disposed on the substrate.

The mounting surface of the substrate in which the LED is mounted may be disposed to be perpendicular to an incident surface of the light guide plate.

The middle mold may include an outer frame, and an intermediate supporter protruding inwardly from the outer frame and supporting a front edge region of the light guide plate.

The outer frame may include an outer coupling portion and an inner coupling portion to be coupled with a bottom chassis, and an insertion groove is formed between the outer coupling portion and the inner coupling portion.

A part of the bottom chassis and the substrate of the light source may be insertion-coupled in the insertion groove.

The inner coupling portion may support the mounting surface of the substrate.

The insertion groove may be formed at one side of the inner coupling portion, and the groove may be formed at another side of the inner coupling portion.

The inner coupling portion may be formed with a width corresponding to a distance between the substrate and the light guide plate.

The groove may be formed at the intermediate supporter.

The display apparatus may further include a light absorbing member disposed between the middle mold and the light guide plate.

The light absorbing member maybe disposed to be more adjacent to an inside of the light guide plate than the groove.

The groove may include a first region that is formed to be perpendicular to the light guide plate and a second region that is formed to be perpendicular to a direction toward the light source from the first region.

The groove may have a plurality of protrusions formed in the inner side surface.

The groove may have the inner side surface coated with a light absorbing member.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, embodiments of a display apparatus will be described in greater detail with reference to the attached drawings.

The embodiments described hereinafter are examples for easy understanding of the disclosure, and it should be understood that various changes can be made to embodiments described herein and the disclosure can be embodied in different forms. In addition, in the following description, detailed descriptions of well-known functions or configurations will be omitted since they would unnecessarily obscure the subject matters of the embodiment. In addition, it should be noted that the drawings as attached are just for easy understanding of the disclosure, and are not illustrated as really scaled, and dimensions of some elements may be exaggerated.

The terms such as "first," "second," and so on may be used to describe corresponding components regardless of importance or order and may be used to distinguish one component from another without limiting the components. For example, without departing from the scope of the disclosure, a first component may be referred to as a second component, and similarly, a second component may also be referred to as a first component.

In addition, as used in the disclosure, the terms such as "up," "down" "front end", "lower end" "upper portion," "lower portion," "upper end," or the like are defined as reference to the drawings, and the shape and position of each component are not limited by the term.

Figure 1:
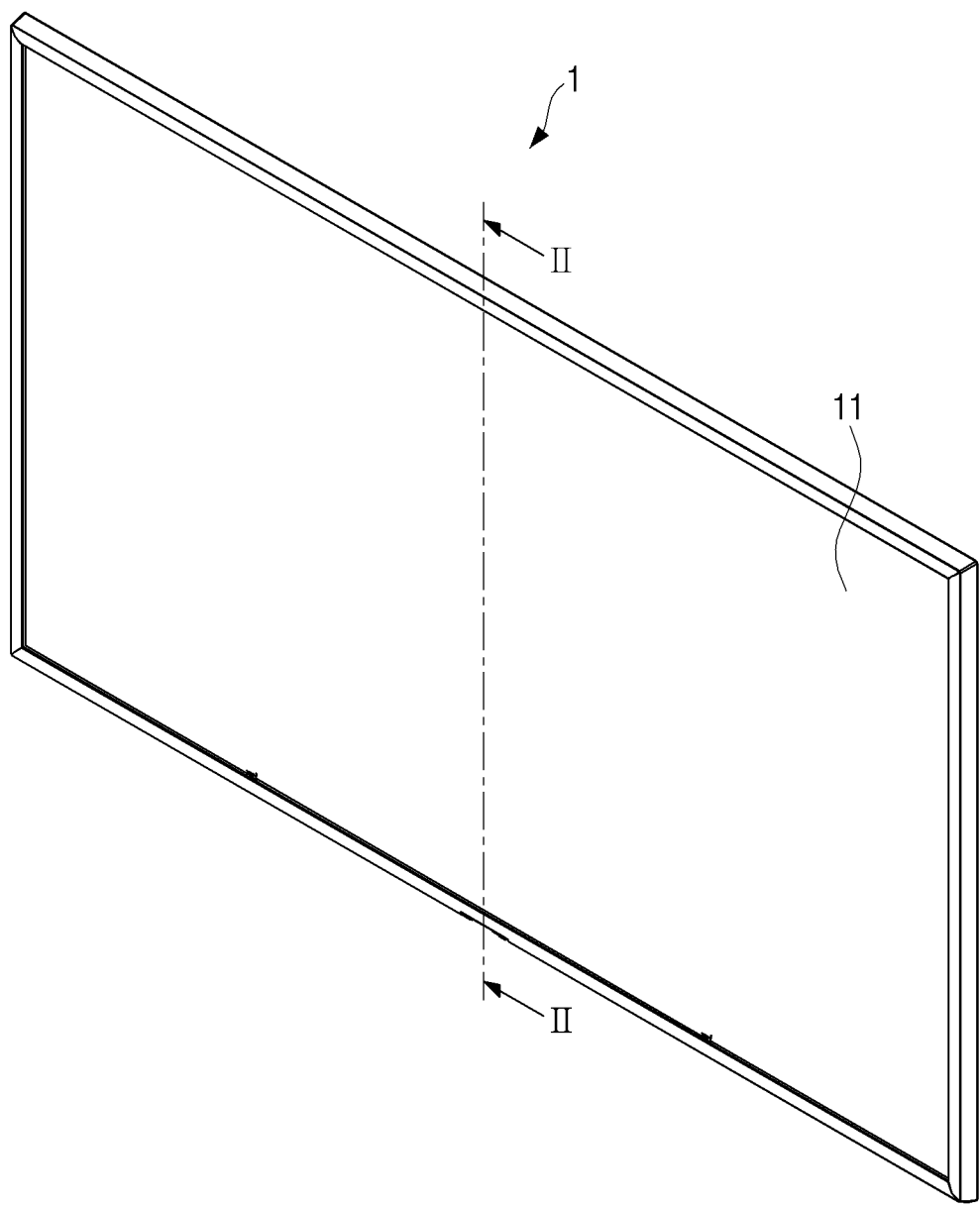
FIG. 1 is a perspective view of a display apparatus according to an embodiment.
Figure 2:
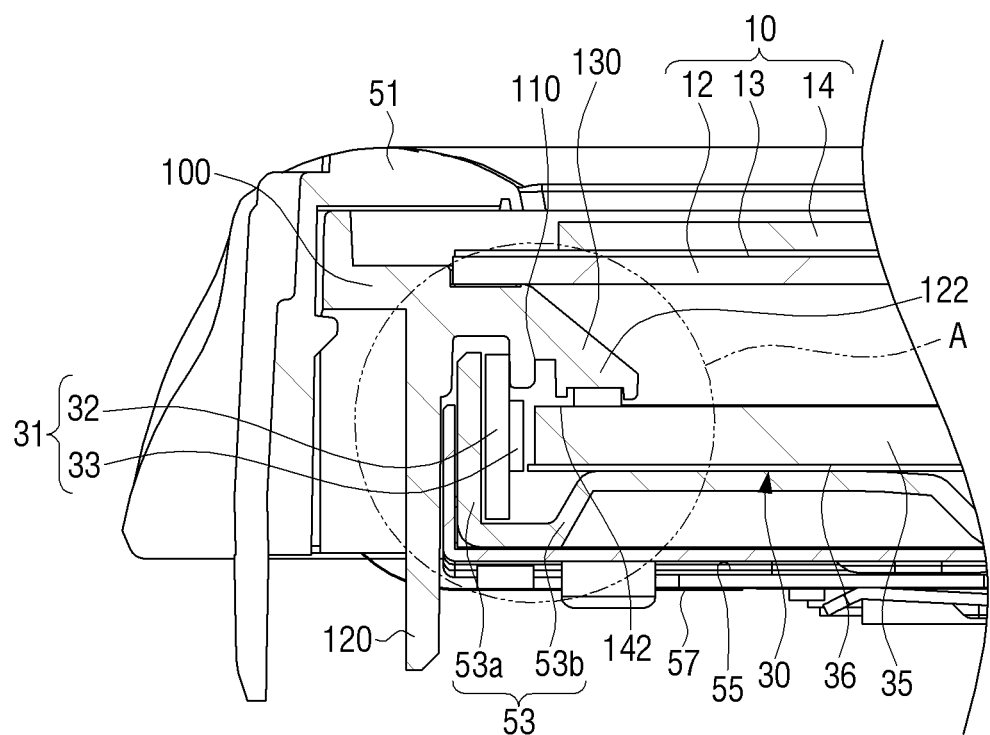
FIG. 2 is a cross-sectional view of a display apparatus illustrated along "II-II" of FIG. 1.
Figure 3:
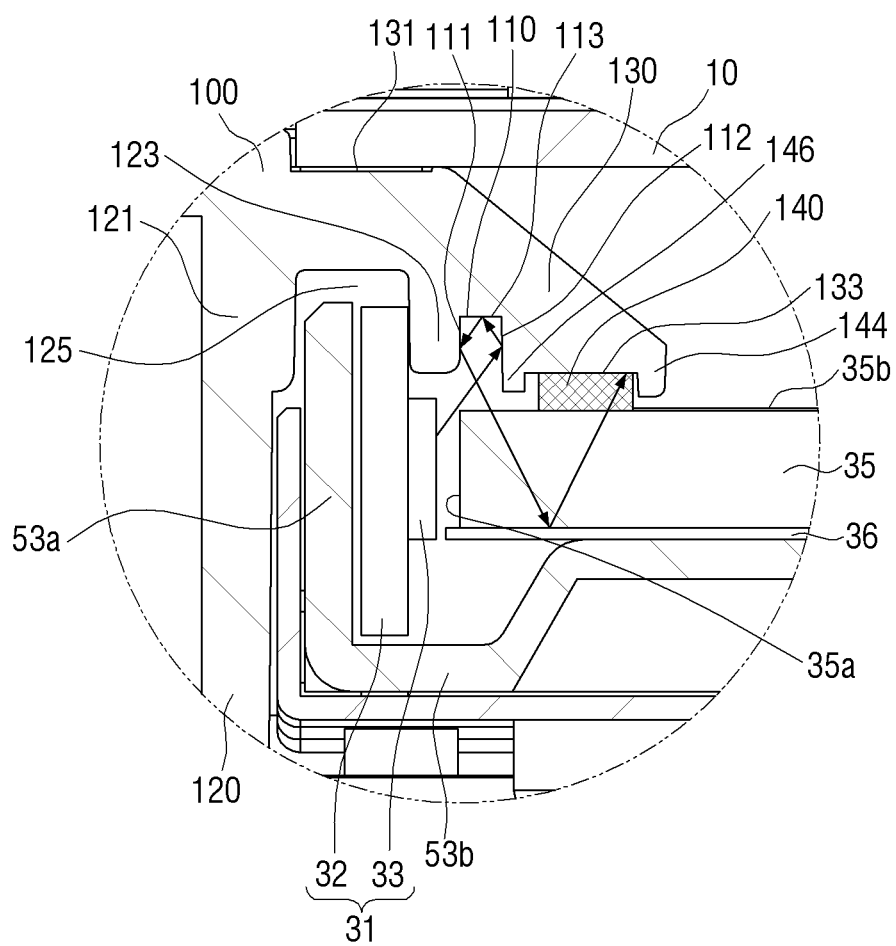
FIG. 3 is an enlarged view of a display apparatus corresponding to "A" illustrated in FIG. 2.

FIG. 1 is a perspective view of a display apparatus according to an embodiment, FIG. 2 is a cross-sectional view of a display apparatus illustrated along "II-II" of FIG. 1, and FIG. 3 is an enlarged view of "A" displayed in FIG. 2.

Referring to FIGS. 1 through 3, a display apparatus 1 includes a display panel 10 forming a screen 11 on which an image is displayed, a backlight 30 for supplying light to the display panel 10, a middle mold 100 which supports an outer portion of the display panel 10, a top chassis 51 for maintaining a state in which the outer portion of the display panel 10 is supported by the middle mold 100, and a bottom chassis 53 that accommodates the backlight 30 and is coupled to a rear side of the middle mold 100.

The display apparatus 1 may include printed circuit board(s) 55 provided in a rear side of the bottom chassis 53 for controlling an operation of the display apparatus, and a case 57 that is installed to cover the rear side of the display apparatus 1 to cover and hide the printed circuit boards.

The display panel 10 includes a first substrate 13 and a second substrate 14 each of which is provided with electrodes and formed with glass, and a liquid crystal panel in which liquid crystal is inserted and formed between the first substrate 13 and the second substrate 14 facing with each other. At a lower side of the display panel 10, a printed circuit board 12 which delivers information to the display panel 10 may be disposed. A chip on film (COF) that electrically connects the printed circuit board 12 and the display panel 10 may be disposed at a lower side of the display panel 10.

Optical sheets to improve the characteristics of light supplied from the backlight 30 may be disposed between the display panel 10 and the backlight 30.

The backlight 30 may be an edge type and may have a light source or light sources 31 disposed in one side of the display apparatus 1 to provide light to the display panel 10.

The backlight 30 may include a light guide plate 35 which is disposed at the rear side of the display panel 10, and a light source 31 disposed, at one side of the light guide plate 35. The backlight 30 may further include a reflection sheet 36 that is disposed at a rear side of the light guide plate to reflect light.

The light guide plate 35 is made of a transparent material to guide light, and the reflection sheet 36 is formed with white color to diffuse and reflect light. The light source 31 may be disposed to face at least one of an upper surface, i.e., a front surface 35b, a lower surface, a left side surface, e.g., the side surface 35a, and a right side surface, e.g., a side surface which is opposite to the side surface 35a, of the light guide plate 35.

The light guide plate 35 may be disposed to be spaced apart from the light source 31 by a predetermined distance in consideration of thermal expansion.

The light source 31 may include a substrate 32 that is disposed to face a side surface 35a and one or more LEDs 33 disposed on the substrate 32.

The substrate 32 may transmit the heat radiated by the LED 33 to a bottom chassis 53 and apply a predetermined voltage to the LED 33 mounted on the substrate 32. In addition, a groove may be formed in the substrate 32 and the LED 33 may be mounted in the substrate 32 so that the substrate 32 surrounds the LED 33 to have a reflective surface on the inside, thereby maximizing the utilization efficiency of light. A plurality of the LEDs 33 may be mounted and disposed on one surface of the substrate 32 in a predetermined direction, for example, in a direction substantially parallel to a long side of the substrate 32.

The substrate 32 may be formed to extend to correspond in a length corresponding to the side surface 35a of the light guide plate 35. A plurality of LEDs 33 may be disposed in a line on the substrate 32 to face a side surface 35a of the light guide plate 35.

A light-emitting portion of the LED 33 may be mounted in a horizontal direction with respect to a mounting surface of the substrate 32. The mounting surface of the substrate 32 may be disposed in parallel with the side surface 35a of the light guide plate 35.

In this case, the light-emitting portion of the LED 33 may be disposed adjacent to the light guide plate 35. In other words, the center of the light-emitting portion may be at the substantially the same position as the center of the light guide plate 35, and accordingly, the light emitted from the light-emitting portion may be incident on the light guide plate 35 with little loss.

The light generated from the LED 33 is incident on the light guide plate 35 through the side surface 35a, i.e., an incident surface, and is emitted through a front surface 35b, i.e., an emitting surface, to the display panel 10.

The LED 33 may use a plurality of light-emitting diodes which emit white-color light, or use a package of light-emitting diodes composed of red (R), green (G), and blue (B).

As described in embodiments, a light source is disposed on one side surface of the light guide plate 35, but this is not limiting, and the light source 31 may be formed of a pair of the light sources 31 disposed on facing opposite side surfaces of the light guide plate 35, or may be formed to be disposed on all four sides of the light guide plate 35. For example, when the light source 31 is formed of the pair of the light sources 31 disposed on opposing side surfaces of the light guide plate 35, the structure of the display apparatus described herein with reference to one side of the display apparatus, i.e., a left side in the FIGS. 2 through 9, may be similarly applied to the other side of the display apparatus, i.e., the right side.

A diffusion sheet and a prism sheet may be disposed in this order on the front side of the light guide plate 35. The light emitted from the light guide plate 35 may be diffused by the diffusion sheet, concentrated by the prism sheet, and then transmitted to the display panel 10.

A middle mold 100 may be disposed between a display panel 10 and the light guide plate 35, and may support an edge area of the light guide plate 35. The middle mold 100 may support the display panel 10 and the light guide plate 35 so that the display panel 10 and the light guide plate 35 are spaced apart from each other by a predetermined distance.

The middle mold 100 may include a panel support surface 131 provided on the front side, in which the display panel 10 is seated and supported, and a light guide plate support surface 133 disposed on a rear side to support the light guide plate 35.

The middle mold 100 may be formed to be a quadrangular ring shape to correspond to an outer portion of the display panel 10.

The middle mold 100 may include one or more grooves 110 formed on a surface adjacent to the light guide plate 35. The groove 110 of the middle mold 100 may prevent a phenomenon that a portion of the light emitted from the LED 33, that is incident on the middle mold 100 is reflected by the middle mold 100, and is visually recognized on the screen 11 of the display apparatus 1, i.e., due to the unintentional illumination.

The top chassis 51 may be formed to be a quadrangular ring shape to correspond to an outer portion of the display panel 10, and may support a front outer portion of the display panel 10.

The bottom chassis 53 may include a support portion 53b formed in a quadrangular plate shape to support the rear surface of the light guide plate 35 and a side portion 53a extending forward from the four ends of the support portion 53b and coupled to the middle mold 100. The bottom chassis 53 is made of a metal material having high heat conductivity such as aluminum or stainless steel so that the heat generated from the backlight 30 may be diffused and radiated.

In the display apparatus, a bright region which is a comparatively bright region compared to a periphery due to leaked light may be generated on both sides of the display panel 10 adjacent to the light source 31.

Therefore, in order to prevent the foregoing, the middle mold 100 of the display apparatus 1 according to an embodiment may have the groove 110 formed in a surface adjacent to the light guide plate 35.

In the case of a groove 110 formed in the middle mold 100, when light of the LED 33 is reflected to a portion of the middle mold 100, a path of light other than the light transmitted by total reflection of the light guide plate 35 may be blocked. The light incident on the middle mold 100 may be incident on at least one of a first inner side surface 111, a second inner side surface 112, and a connecting surface 113 that are formed in the middle mold 100 and surround the groove 110, and light intensity may be reduced. Accordingly, the light incident on the middle mold 100 is not directly emitted to the screen 11, due to being reflected inside the groove 110, and thus, a phenomenon that a dark portion and a bright portion are displayed on the screen 11 due to the reflection of light to the middle mold 100 may be prevented.

Hereinafter, a specific structure of the middle mold 100 will be described.

Referring to FIG. 3, the display panel 10 and the backlight 30 may be supported so that the display panel 10 and the backlight 30 are spaced apart from each other by the middle mold 100.

The middle mold 100 may include an outer frame 120 and an intermediate supporter 130 which has a protruding portion 122 protruding inward from the outer frame 120, in a downward direction with respect to the display panel 10, to support a front edge region of the light guide plate 35.

The outer frame 120 may have an outer coupling portion 121 and an inner coupling portion 123 for coupling with the bottom chassis 53. The outer coupling portion 121 may be provided on an outer side of the display apparatus and the inner coupling portion 123 may be provided on an inner side of the display apparatus, with respect to an exterior surface of the display apparatus.

An insertion groove 125 may be formed between the outer coupling portion 121 and the inner coupling portion 123.

In the insertion groove 125 between the outer coupling portion 121 and the inner coupling portion 123, a side portion 53a of the bottom chassis 53 may be inserted, and the middle mold 100 and the bottom chassis 53 may be coupled. The bottom chassis 53 may be inserted and coupled to the middle mold 100.

The substrate 32 of the light source 31 may be disposed on the side surface 35a of the light guide plate 35. The substrate 32 may be formed on the rear surface of the light guide plate 35 and have a height higher than that of the substrate curved on one side. In order to support the substrate 32, the middle mold 100 may include the inner coupling portion 123 for supporting at least a part of the substrate 32.

The light source 31 may be disposed on one side of the display apparatus 1, and in one side where the light source 31 is disposed, the light source 31 and the side portion 53a of the bottom chassis 53 may be disposed in the insertion groove 125 between the outer coupling portion 121 and the inner coupling portion 123. At least one from among a part of the light source 31 and the bottom chassis 53 may be insertion-coupled to the insertion groove 125, e.g., fitted into the insertion groove 125.

The groove 110 of the middle mold 100 may be formed on an opposite side of the insertion groove 125, with respect to the inner coupling portion 123.

The intermediate supporter 130 may include a panel support surface 131 for supporting a rear surface edge region of the display panel 10 and a light guide plate support surface 133 for supporting an edge region 142 of a front surface 35b of the light guide plate 35.

The panel support surface 131 may be formed to be flat for adherence with the rear surface of the display panel 10.

The light guide plate support surface 133 may be formed to be flat for adherence with the front edge region of the light guide plate 35. The light guide plate support surface 133 may support the front edge region of at least three side surfaces among the four side surfaces of the front surface 35b of the light guide plate 35.

For example, there might be a case when a gap is generated between the light guide plate support surface 133 and the edge region 142 of the front surface 35b of the light guide plate 35 by a tolerance of parts, an error of assembly, a deformation of the light guide plate 35, or the like. To surely prevent the light emitted from the light source 31 from escaping between the light guide plate 35 and the middle mold 100, the display apparatus 1 may include a light absorbing member 140 provided between the light guide plate support surface 133 and the edge region 142 of the front surface 35b. The light absorbing member may be disposed closer to the light guide plate 35 than to an opening of the groove that is formed by the first inner side surface 111 and the second inner side surface 112, e.g., the light absorbing member 140 may be adjacent to an upper surface of the light guide plate 35.

The light guide plate support surface 133 may be formed to be concave in a shape corresponding to the light absorbing member 140 to situate the light absorbing member 140. The formed concave space may be flanked by a first prong 144 and a second prong 146 that protrude toward the light guide plate 35.

The intermediate supporter 130 may be formed to have a thickness corresponding to a distance between the panel support surface 131 and the light guide plate support surface 133. The thickness of the intermediate supporter 130 may be determined by a predetermined distance between the light guide plate 35 and the display panel 10. Accordingly, the middle mold 100 may support the display panel 10 and the light guide plate 35, so that the display panel 10 and the light guide plate 35 are disposed to be spaced apart from each other by a predetermined distance.

The light source 31 according to an embodiment may include the substrate 32 disposed on the side surface 35a of the light guide plate 35. The substrate 32 is disposed on the rear surface of the light guide plate 35 to have a height higher than that of a curved substrate in one side. Thus, in order to support the substrate 32, the middle mold 100 may be formed to have a predetermined thickness to support a part of the substrate 32.

Accordingly, the intermediate supporter 130 may be formed to have a predetermined thickness, and the groove 110 having a predetermined depth at a surface adjacent to the light guide plate 35 of the intermediate supporter 130 may be formed.

The groove 110 may be formed such that a first inner side surface 111 within the groove is disposed collinearly with the side surface 35a of the light guide plate 35. The groove 110 may include a second inner side surface 112 which is disposed to face the first inner side surface 111. The first inner side surface 111 and the second inner side surface 112 may be connected by a connecting surface 113. A cross section of the groove 110 may be a shape of a quadrangle or another appropriate shape, as described below.

Unlike in the related art apparatus, in an exemplary embodiment, a portion of the light generated from the LED 33, which is irradiated to a part of the middle mold 100 may be incident on the groove 110 formed in the middle mold 100, and, thus, the light intensity may be reduced due to the groove 110.

More specifically, as shown by the arrows, the light irradiated to the middle mold 100 and incident on the groove 110, may be reflected onto the second inner side surface 112, incident on the connecting surface 113, reflected from the connecting surface 113 to be incident on the first inner side surface 111, and then reflected be incident on the front surface 35b of the light guide plate 35.

As such, the light, which escapes from the groove 110 and is incident on the front surface 35b of the light guide plate 35, may have a reduced intensity by having been reflected in the inside space of the groove one or more times. In other words, the light incident on the groove 110 is reflected at least once in the groove 110, and then is emitted to the outside of the groove 110. Therefore, the intensity of light escaping from the groove 110 may be reduced as compared to the intensity of light entering into the groove 110.

Since the light escaping from the groove 110 has a smaller light intensity, even if the light is incident on the light guide plate 35 and transmitted to the display panel 10, the effect on the screen 11 is negligent. Accordingly, it is possible to prevent light leakage due to light provided to the display panel 10 by a path of light other than the path of light in which the light is incident on the incident surface of the light guide plate 35 and emitted to the emitting surface.

Accordingly, the groove 110 may block the light incident on the middle mold 100 from being provided to the display panel 10 and thus, light emitted to the display panel 10 by the path of light, other than the light that is incident on the side surface 35a of the light guide plate 35 and emitted to the display panel 10 by the total reflection, may be blocked or minimized.

The light absorbing member 140 may be disposed inside the groove 110 formed in the intermediate supporter 130. The light absorbing member 140 may absorb light escaping from the groove 110 so that the light is not transmitted to the display panel 10. The light absorbing member 140 may secondarily block the light incident on the middle mold 100.

The light absorbing member 140 may prevent or minimize an event that the light escapes between the light guide plate 35 and the middle mold 100.

The light absorbing member 140 may have a white color to minimize the heat generation by reflecting light so as to prevent or minimize that the heat generated from the light source 31 is absorbed through the light absorbing member 140 and transmitted to the middle mold 100, which is mainly injection-molded into a black material, and further emitted to the display panel 10, or the like.

The light absorbing member 140 is coupled to the light guide plate support surface 133 of the intermediate supporter 130. The light absorbing member 140 is formed of a high density polyurethane foam material having functions of impact absorption, light shielding effect, external pressure protection, anti-vibration/minimization, dustproofing effect, airtightness, and an interval correction, or the like. The light absorbing member 140 is disposed in a shape of a strip surrounding the light guide plate, and is pressed and elastically deformed between the middle mold 100 and the light guide plate 35.

The middle mold 100 and the light guide plate 35 of the light absorbing member 140 may be in close contact with each other. Accordingly, light leakage between the light guide plate 35 and the middle mold 100 may be prevented or minimized.

The light absorbing member 140 may be formed with silicon, rubber mixture, chemicals, or the like.

The groove 110 may be formed in the intermediate supporter 130 outside the light absorbing member 140 and proximate thereto. The groove 110 is to primarily block the light reflected to the middle mold 100, and the light absorbing member 140 is to secondarily block the light reflected to the middle mold 100. That is, the light absorbing member 140 may block any remaining part of the light that is not trapped by the groove 110, so that an entire portion of the light that is not incident on the side surface 35a is blocked from reaching the display panel.

Hereinbelow, a process in which the light emitted to the middle mold 100 is blocked by the groove 110 formed in the middle mold 100 and the light absorbing member 140 will be described in detail.

A part of the light irradiated from the LED 33 may be incident on the middle mold 100. The light incident on the middle mold 100 may be reflected by the middle mold 100, be incident on the front surface 35*b* of the light guide plate 35, and then emitted to the front surface 35*b* of the light guide plate 35 again. The light is emitted by the path of light other than the lights emitted through the side surface 35*a* of the light guide plate 35 and thus, a light leakage phenomenon indicating that a specific portion of the screen 11 is brightened may occur.

In order to prevent the light leakage phenomenon, the groove 110 may be formed to correspond to a position of light incident on the middle mold 100.

Accordingly, the light incident on the middle mold 100 may be incident on the inside of the groove 110. The light incident on the groove 110 may be reflected in the groove 110 and intensity of light may be reduced. That is, the light incident on the inside surfaces of the groove 110 may be trapped by the groove or its intensity may be substantially reduced.

The light incident on the groove 110 is reflected to the inner wall of the groove 110 at least once, and the light intensity may be reduced. The light escaping from the groove 110 may have reduced light intensity than the light incident on the groove 110, and the light incident on the middle mold 100 may be primarily blocked.

Even if the light emitted from the groove 110 is incident on the front surface of the light guide plate 35, the light intensity is small and thus, the light provided to the display panel 10 may hardly affect the illumination of the screen 11.

In addition, even if the light emitted from the groove 110 is incident on the front surface of the light guide plate 35, the light may be secondarily blocked by the light absorbing member 140 formed outside the groove 110 of the middle mold 100.

Accordingly, it may be possible to prevent or minimize an event that the light is provided to the display panel 10 by the path of light other than the path in which the light is incident on the side surface 35*a* of the light guide plate 35.

FIGS. 4 to 9 are cross-sectional views of a display apparatus according to an embodiment.

Figure 4:
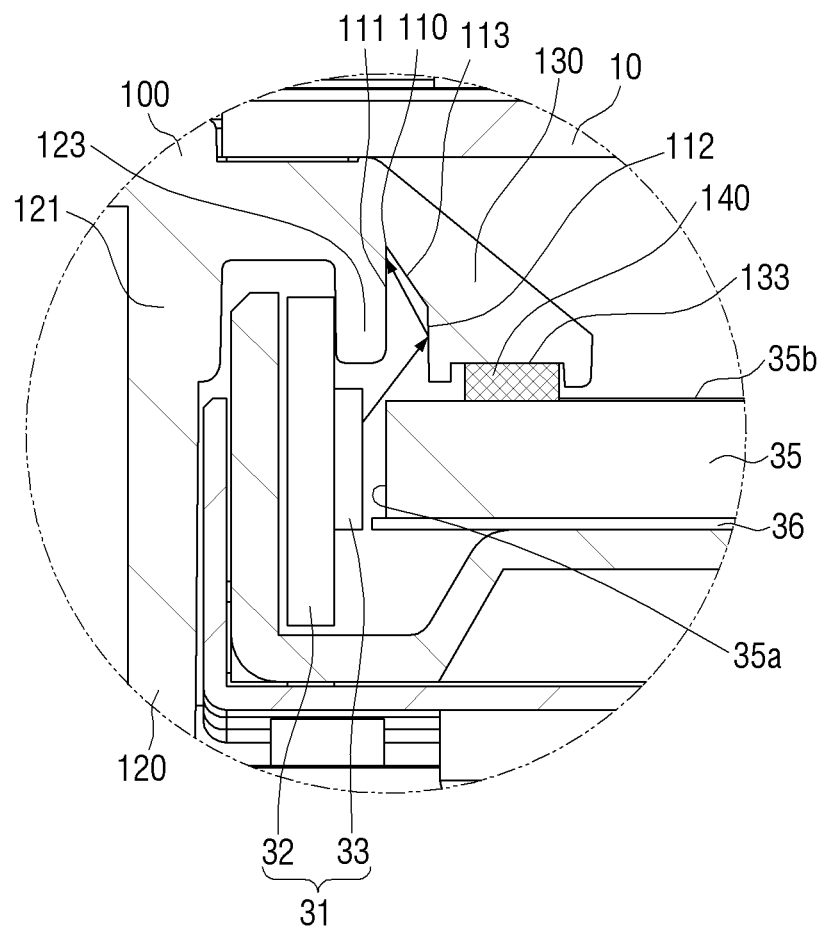
FIG. 4 is a cross-sectional view of a display apparatus according to an embodiment.

Referring to FIG. 4, a cross section of the groove 110 may be in a shape of a trapezoid.

The groove 110 may include the first inner side surface 111 formed to be collinear with the side surface 35*a* of the light guide plate 35. The groove 110 may include a second inner side surface 112 disposed opposite the first inner side surface 111. The connecting surface 113 may connect the first inner side surface 111 and the second inner side surface 112.

The first inner side surface 111 and the second inner side surface 112 may be formed in the intermediate supporter 130 and formed vertically from the light guide plate support surface 133. The first inner side surface 111 may extend further vertically inward than the second inner side surface 112, with respect to the intermediate supporter 130. The connecting surface 113 may be formed to be inclined downward from the second inner side surface 112 toward the first inner side surface 111, forming an acute angle with the first inner side surface 111 and facing the light source 31.

As shown by the arrows, the light incident on a part of the middle mold 100 may be incident on the groove 110 and reflected in a direction of the first inner side surface 111 along the connecting surface 113 from the second inner side surface 112.

When the cross section of the groove is formed in a trapezoidal shape, some of the light incident on the groove 110 may advance in the inner side direction of the groove 110 by the connecting surface 113, and is not emitted outside the groove 110. The groove 110 may effectively prevent or minimize providing light to the display panel 10 by a path of light other than light that is incident on the side surface 35*a* of the light guide plate 35.

Figure 5:
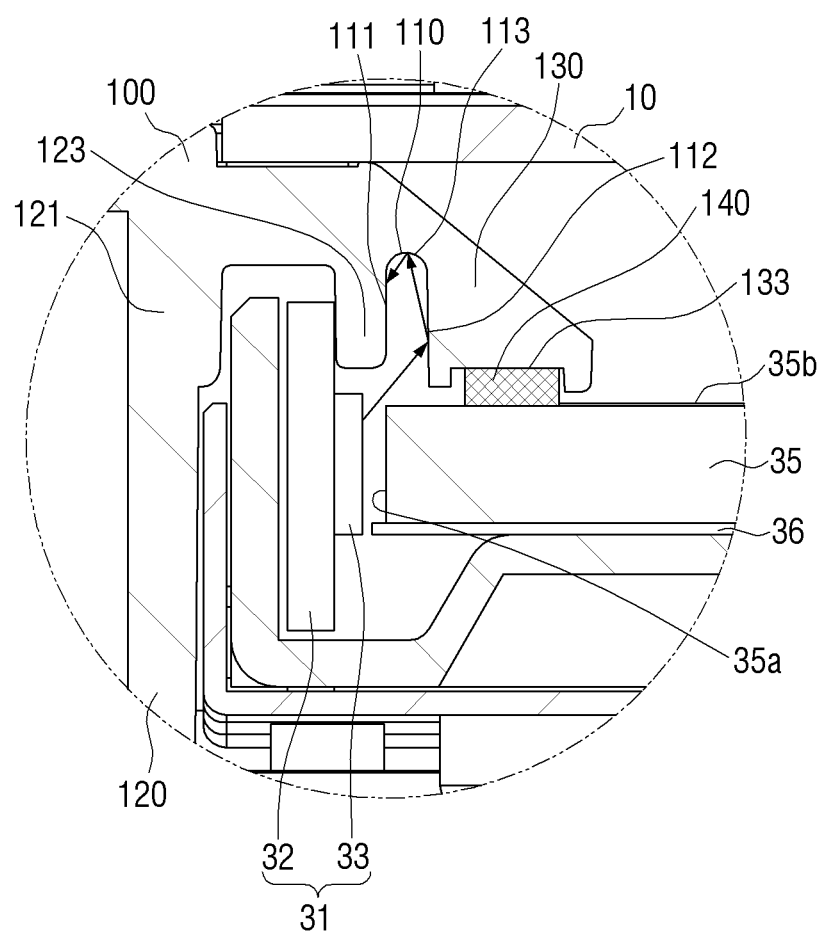
FIG. 5 is a cross-sectional view of a display apparatus according to an embodiment.

Referring to FIG. 5, the cross section of the groove 110 may have a shape of a semicircle.

The groove 110 may include a first inner side surface 111 inside the groove that is formed collinearly with the side surface 35*a* of the light guide plate 35 and a second inner side surface 112 disposed opposite to the first inner side surface 111. The first inner side surface 111 and the second inner side surface 112 may be connected by a connecting surface 113 which may be curved.

As shown by the arrows, the light incident on a part of the middle mold 100 may be incident on the groove 110 and reflected toward the connecting surface 113 from the second inner side surface 112. The connecting surface 113 may form various angles of a reflective surface and thus may effectively disperse the light incident on the groove 110 so that the light is not reflected back to the light guide plate 35.

Figure 6:
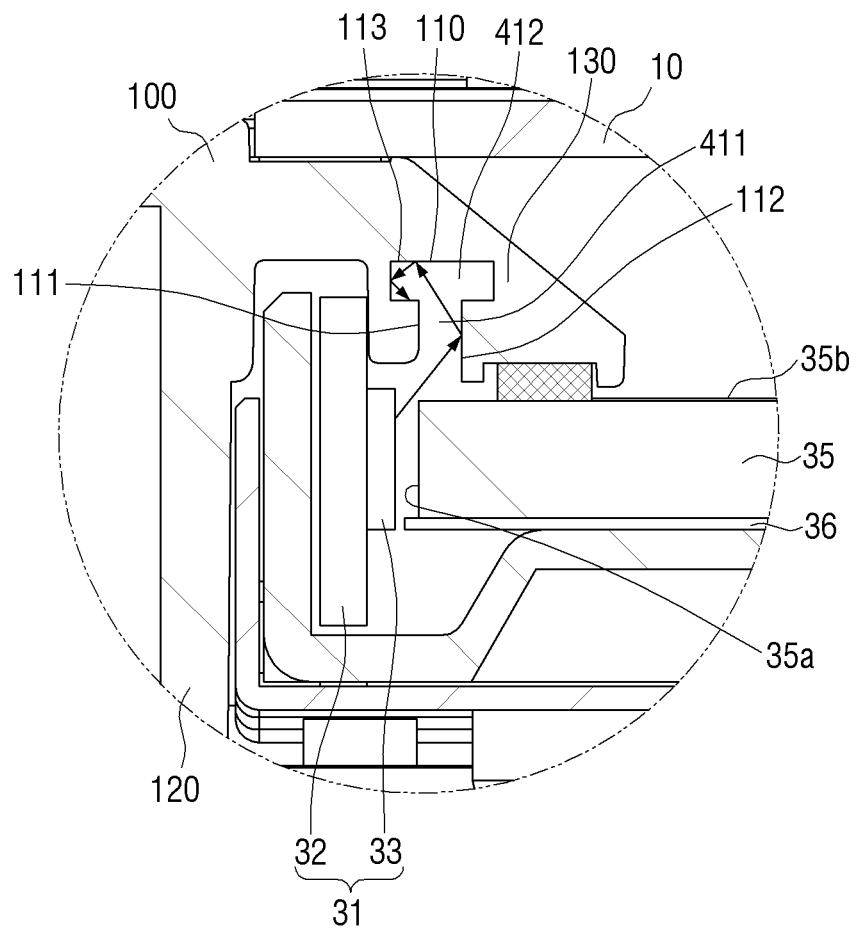
FIG. 6 is a cross-sectional view of a display apparatus according to an embodiment.

Referring to FIG. 6, a cross section of the groove 110 is formed in a T-shape.

The groove 110 may be formed as a first region 411 that is perpendicular to the light guide plate 35 and a second region 412 perpendicular to the first region 411. The second region 412 may be formed to protrude, as groove regions, from the first and second inner side surfaces 111, 112 of the first region 411.

The light incident on a part of the middle mold 100 may be incident on the groove 110. As shown by the arrows, the light incident on the groove 110 may be reflected toward the second region 412 from the second inner side surface 112 of the first region 411, reflected inside the second region 412, and is not emitted to the outside of the groove 110.

When the groove 110 includes the second region 412, it may be possible to prevent an event that the light incident on the groove 110 advances to the outside of the groove 110.

Figure 7:
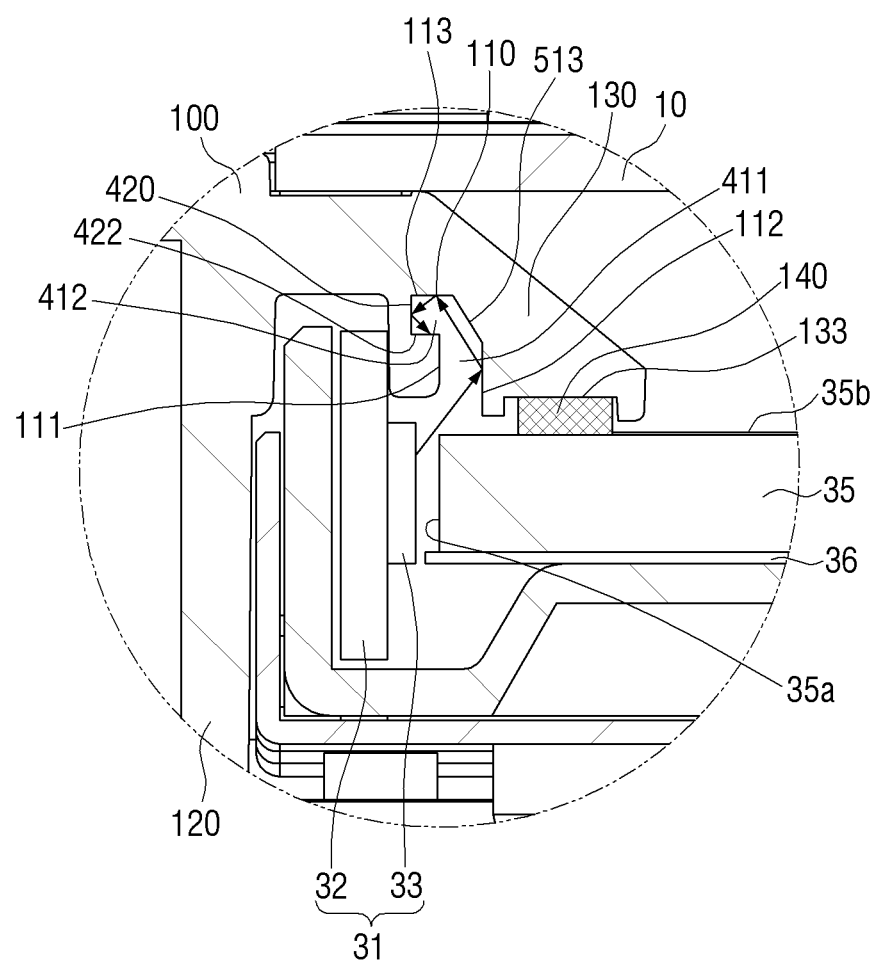
FIG. 7 is a cross-sectional view of a display apparatus according to an embodiment.

Referring to FIG. 7, a cross section of the groove 110 may be formed to be an L-shape.

The groove 110 may include a first region 411 perpendicular to the light guide plate 35 and a second region 412 that is formed to protrude in a direction of the light source 31 from the first region 411. The second region 412 may have a third inner side surface 420 parallel to the first inner side surface 111 and a bottom surface 422 which connects the third inner side surface 420 and the first inner side surface 111. An inclined surface 513 of the first region 411 connects the connecting surface 113 and the first inner side surface 111, thereby connecting the first region 411 and the second region 412.

As shown by the arrows, the light incident on a part of the middle mold 100 may be incident on the groove 110 and reflected toward the second region 412 along the inclined surface 513 from the first inner side surface 111 of the first region 411. The light reflected to the second region 412 may advance to the second region 412 formed to protrude from one side of the first region 411, and is not emitted out of the groove 110. Thus, it is possible to effectively prevent or minimize the light from being provided to the display panel 10 by another path of light other than the light which is incident on the side surface 35*a* of the light guide plate 35.

Figure 8:
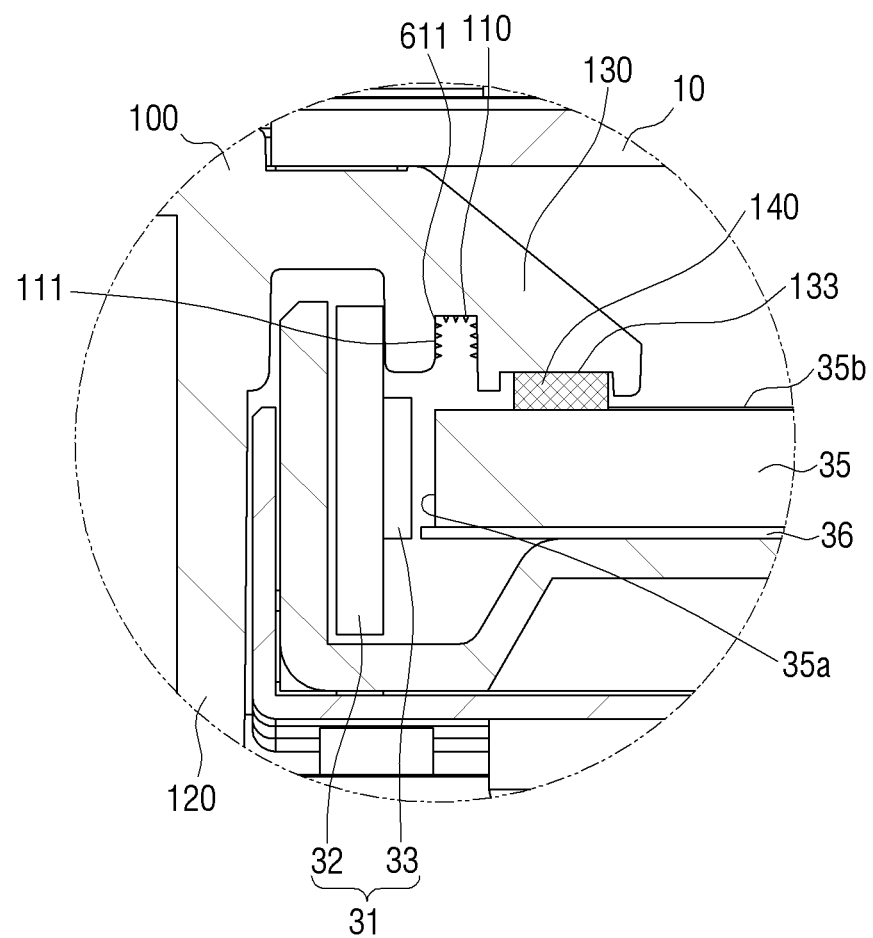
FIG. 8 is a cross-sectional view of a display apparatus according to an embodiment.

Referring to FIG. 8, a groove 110 may include one or more protrusions 611 that are formed to protrude inside the groove from at least one from among the first inner side surface 111, the second inner side surface 112, and the connecting surface 113. However, this is not limiting one or more protrusions may protrude to the outside of the groove.

The protrusion 611 may form a reflective surface so that the light incident on the groove 110 may be reflected at least once. Accordingly, the light incident on the groove 110 may be effectively dispersed by the protrusion 611.

Figure 9:
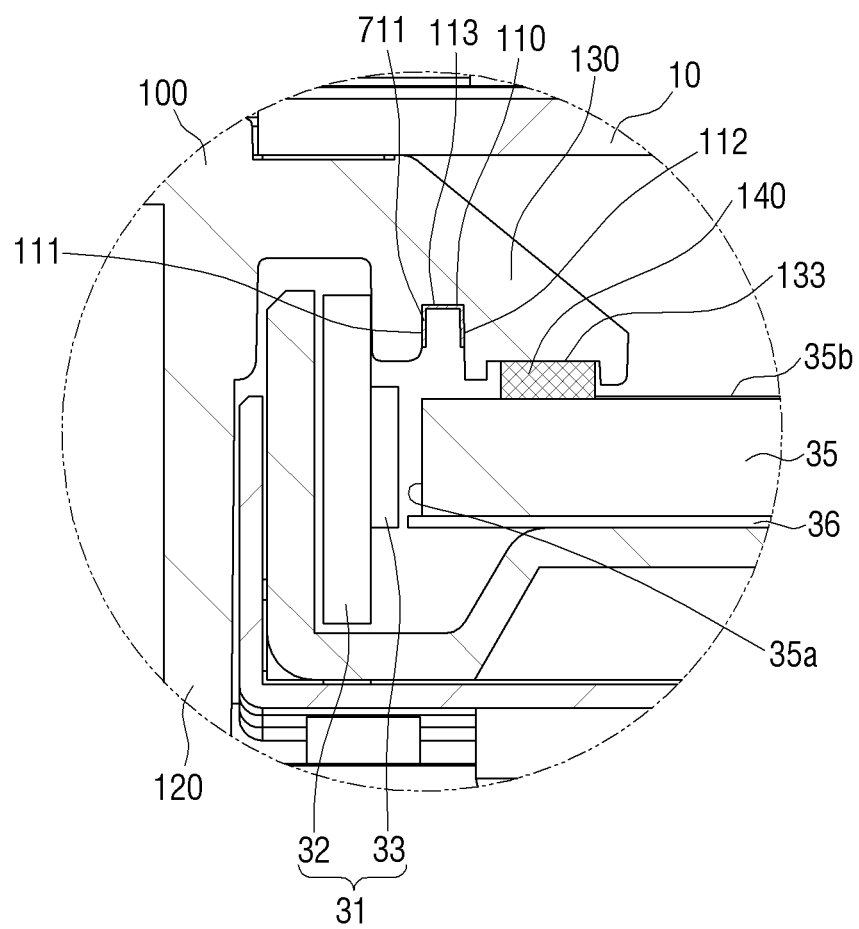
FIG. 9 is a cross-sectional view of a display apparatus according to an embodiment.

Referring to FIG. 9, a coating layer 711 may be formed at least one of the first inner side surface 111, the second inner side surface 112, or the connecting surface 113 of a groove 110. The coating layer 711 may be made of a light absorbing member. That is, the coating layer 711 may be formed of a material that absorbs light. The coating layer 711 may be formed by coating on at least one of the first inner side surface 111, the second inner side surface 112, or the connecting surface 113 of the groove 110 in the form of an additive that absorbs light.

The coating layer 711 may absorb the light incident on the groove 110 and prevent the light from being emitted to the outside of the groove 110. Thus, it is possible to effectively prevent the light from being provided to the display panel 10 by a path of light other than the path in which light is incident on the side surface 35a of the light guide plate 35.

As illustrated in FIGS. 1 to 9, the light incident on the middle mold 100 is emitted toward the inner space of the groove 110, and the light incident on the inside of the groove 110 may be reflected at least once on the inner wall of the groove 110, thereby reducing the light intensity. Even if the light escapes from the groove 110, the light may have a reduced light intensity as compared to that of the initial light incident on the groove 110, and, thus, the light incident on the middle mold 100 may be effectively blocked or prevented from proceeding to the display panel, thereby not having an effect on the uniformity of the screen illumination.

Further, in the case that the light escapes the groove 110 and becomes incident on the front surface 35b of the light guide plate 35, the light may be secondarily blocked by the light absorbing member 140 that is formed at the outside of the groove 110.

Accordingly, it is possible to may prevent or substantially minimize an event that the light is provided to the display panel 10 by another path of light other than the light which is incident on the side surface 35a of the light guide plate 35.

The disclosure has been described in an illustrative manner. The terms used herein are for the purpose of description and should not be construed as limiting the embodiment. Various modifications and variations of the disclosure are possible in light of the above teachings. Accordingly, unless otherwise specified, the disclosure may be embodied within the scope of the claims.

What is claimed is:

1. A display apparatus comprising:
a display panel;
a light guide plate configured to guide light to the display panel;
a light source comprising a substrate and a plurality of light emitting diodes (LEDs) configured to irradiate the light guide plate with light, the plurality of LEDs being disposed on a mounting surface of the substrate that is parallel to a side surface of the light guide plate; and
a middle mold disposed between the display panel and the light guide plate, the middle mold comprising:
a support surface configured to support the light guide plate and comprising a light guide plate support surface supporting an edge region of the light guide plate,
an inner coupling portion which extends along the mounting surface of the substrate, and
a groove formed at the support surface, adjacent to the light guide plate between the light guide plate support surface and the inner coupling portion.

2. The display apparatus of claim 1, wherein the groove is surrounded by inner side surfaces which are formed in the middle mold and face an inside of the groove, and
one of the inner side surfaces is collinear with one side surface of the light guide plate.

3. The display apparatus of claim 1, wherein the groove is formed along the edge region of the light guide plate.

4. The display apparatus of claim 1, wherein a cross section of the groove is one of a quadrangle, a trapezoid, a semicircle, a polygon, or a T.

5. The display apparatus of claim 1, wherein the groove is surrounded by inner side surfaces which are formed in the middle mold and face an inside of the groove, and
one of the inner side surfaces comprises an inclined surface that is inclined toward the light source.

6. The display apparatus of claim 1, wherein the light source is disposed to face at least one from among a left side surface and a right side surface of the light guide plate.

7. The display apparatus of claim 1, wherein
the mounting surface of the substrate is perpendicular to an emitting surface of the light guide plate.

8. The display apparatus of claim 7, wherein the middle mold further comprises:
an outer frame; and
an intermediate supporter which protrudes inwardly from the outer frame and supports the edge region of the light guide plate.

9. The display apparatus of claim 8, wherein:
the outer frame comprises an outer coupling portion configured to be coupled with a bottom chassis, and
an insertion groove is formed between the outer coupling portion and the inner coupling portion.

10. The display apparatus of claim 9, wherein a part of the bottom chassis and the substrate of the light source are coupled to the middle mold by being inserted into the insertion groove.

11. The display apparatus of claim 9, wherein the inner coupling portion supports the mounting surface of the substrate.

12. The display apparatus of claim 9, wherein the insertion groove is formed at one side of the inner coupling portion, and
the groove is formed at another side of the inner coupling portion.

13. The display apparatus of claim 9, wherein the inner coupling portion is formed with, a width corresponding to a distance between the substrate and the light guide plate.

14. The display apparatus of claim 8, wherein the groove is formed in the intermediate supporter.

15. The display apparatus of claim 1, further comprising:
a light absorbing member disposed between the middle mold and the light guide plate.

16. The display apparatus of claim 15, wherein the light absorbing member is disposed closer to the light guide plate than an opening of the groove.

17. A display apparatus comprising:
a display panel;
a light guide plate configured to guide light to the display panel;
a light source configured to irradiate the light guide plate with light; and
a middle mold disposed between the display panel and the light guide plate, the middle mold comprising:

a support surface configured to support the light guide plate, and a groove formed at the support surface, adjacent to the light guide plate, wherein the groove comprises:

a first region that is formed to be perpendicular to the light guide plate, and a second region that is formed to be perpendicular to the first region and extends in a direction toward the light source from the first region.

18. The display apparatus of claim 1, wherein the groove is surrounded by inner side surfaces which are formed in the middle mold and face an inside of the groove, and a plurality of protrusions is formed in at least one of the inner side surfaces.

19. The display apparatus of claim 1, wherein the groove is surrounded by inner side surfaces which are formed in the middle mold and face an inside of the groove, and at least one of the inner side surfaces is coated with a light absorbing member.

\* \* \* \* \*